United States Patent
Tian et al.

(10) Patent No.: US 12,278,915 B2
(45) Date of Patent: Apr. 15, 2025

(54) PROVISIONING METHOD AND TERMINAL DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Ye Tian, Beijing (CN); Xiaoming Ren, Beijing (CN)

(73) Assignees: CHINA MOBILE COMMUNICATIONS CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 435 days.

(21) Appl. No.: 17/781,840

(22) PCT Filed: Nov. 30, 2020

(86) PCT No.: PCT/CN2020/132712
§ 371 (c)(1),
(2) Date: Jun. 2, 2022

(87) PCT Pub. No.: WO2021/109967
PCT Pub. Date: Jun. 10, 2021

(65) Prior Publication Data
US 2023/0007480 A1    Jan. 5, 2023

(30) Foreign Application Priority Data

Dec. 3, 2019 (CN) .......................... 201911219000.X

(51) Int. Cl.
*H04L 9/32* (2006.01)
*H04W 12/069* (2021.01)

(52) U.S. Cl.
CPC ......... *H04L 9/3273* (2013.01); *H04W 12/069* (2021.01)

(58) Field of Classification Search
CPC ............. H04W 12/069; H04W 12/037; H04W 12/043; H04W 12/35; H04W 4/40;
(Continued)

(56) References Cited

U.S. PATENT DOCUMENTS 9,124,573 B2 * 9/2015 Chastain ............. H04L 63/0876
10,122,534 B2 * 11/2018 Chastain ................. H04L 63/08
(Continued)

FOREIGN PATENT DOCUMENTS

CA    2986223 C  * 12/2019    ......... H04L 63/0823
CN    101163013 A    4/2008
(Continued)

OTHER PUBLICATIONS

Ning, Hong-zhou (CN 107645471 A), A Method And System For Mobile Terminal User Identity Authentication, pub: Jan. 30, 2018, (Year: 2018), All pages.*
(Continued)

*Primary Examiner* — Mahendra R Patel
(74) *Attorney, Agent, or Firm* — Cooper Legal Group, LLC

(57) ABSTRACT

The present disclosure provides a provisioning method and a terminal device. The provisioning method is applied to the terminal device, including: the security module establishes a secure channel with the certificate authority CA server through one or more session keys shared by the security module and the CA server; and obtains one or more digital certificates from the CA server; wherein, the security module
(Continued)

is to implement Universal Subscriber Identity Module (USIM) functions.

9 Claims, 5 Drawing Sheets

(58) Field of Classification Search
CPC ............. H04L 2209/84; H04L 9/0877; H04L 9/3263; H04L 63/06; H04L 9/3273; H04L 63/0428
USPC ........................................ 455/411
See application file for complete search history.

(56) References Cited

U.S. PATENT DOCUMENTS

| | | | | |
|---|---|---|---|---|
| 12,101,630 | B2* | 9/2024 | Yang | H04W 12/03 |
| 2009/0044007 | A1* | 2/2009 | Ferrazzini | H04L 63/062 |
| | | | | 713/155 |
| 2009/0209232 | A1* | 8/2009 | Cha | H04L 63/06 |
| | | | | 455/411 |
| 2012/0100832 | A1 | 4/2012 | Mao | |
| 2015/0095648 | A1 | 4/2015 | Nix | |
| 2016/0021529 | A1* | 1/2016 | Park | H04W 8/205 |
| | | | | 455/410 |
| 2016/0149710 | A1 | 5/2016 | Huxham et al. | |
| 2016/0234177 | A1* | 8/2016 | Bone | H04W 12/06 |
| 2017/0142121 | A1* | 5/2017 | Lee | H04L 63/0853 |
| 2018/0351945 | A1 | 12/2018 | Li et al. | |
| 2019/0156019 | A1 | 5/2019 | Chen | |
| 2019/0200228 | A1 | 6/2019 | Adrangi et al. | |
| 2020/0084622 | A1* | 3/2020 | Yoon | H04W 12/35 |
| 2020/0162247 | A1* | 5/2020 | Nix | H04L 9/0841 |
| 2020/0413249 | A1* | 12/2020 | Ramisetty | H04L 63/0853 |

FOREIGN PATENT DOCUMENTS

| | | | | |
|---|---|---|---|---|
| CN | 102811224 | A * | 12/2012 | |
| CN | 106453196 | A | 2/2017 | |
| CN | 107645471 | A * | 1/2018 | |
| CN | 108282467 | A * | 7/2018 | ......... H04L 63/0823 |
| CN | 108809637 | A | 11/2018 | |
| EP | 3541106 | A1 * | 9/2019 | ............. H04L 29/06 |
| JP | 2019149714 | A | 9/2019 | |
| WO | WO-2009046400 | A1 * | 4/2009 | ......... H04L 63/0428 |
| WO | WO-2017192161 | A1 * | 11/2017 | ......... H04L 63/0823 |

OTHER PUBLICATIONS

International Search Report in the international application No. PCT/CN2020/132712, mailed on Feb. 10, 2021, 2 pgs.
English translation of the Written Opinion of the International Search Authority in the international application No. PCT/CN2020/132712, mailed on Feb. 10, 2021, 3 pgs.
"Deliverable D4.2 Final Design and Evaluation of the 5G V2X System Level Architecture and Security Framework", Nov. 2019, Jesús Alonso et al., Version v1.1, Fifth Generation Communication Automotive Research and Innovation, Reprinted from the Internet at: http://www.5g-ppp.eu, 153 pgs.
"A Security Credential Management System for V2V Communications", Dec. 2013, William Whyte, Andre Weimerskirch, Virendra Kumar and Thorsten Hehn, 2013 IEEE Vehicular Networking Conference, 8 pages.
"Secure Vehicular Communication Systems: Design and Architecture", Nov. 2008, Panagiotis Papadimitratos, Levente Butty, Tamas Holczer, Elmar Schoch, Julien Freudiger, Maxim Raya, Zhendong Ma, Frand Kargl, Antionio Kung and Jean-Pierre Hubaux, IEEE Communications Magazine, vol. 46, Issue: 11, pp. 100-109.
"Study on Security Aspects for LTE Support of Vehicle-to-Eveything (V2X) Services", Sep. 2017, 3GPP TR 33.885 V14.1.0; 3rd Generation Partnership Project; Technical Specification Group Services and System Aspects; 75 pages.
"Generic Bootstrapping Architecture"; Sep. 2019; 3GPP TS 33.220 V16/0/0; 3rd Generation Partnership Project; Technical Specification Group Services and System Aspects; Generic Authentication Architecture(GAA); 93 pages.
Supplementary European Search Report in the European application No. 20895692.0, mailed on Nov. 8, 2023, 10 pages.

* cited by examiner

PROVISIONING METHOD AND TERMINAL DEVICE

CROSS-REFERENCE TO RELATED APPLICATION

The application claims priority to Chinese patent application No. 201911219000.X, filed on Dec. 3, 2019, the disclosure of which is hereby incorporated by reference in its entirety.

TECHNICAL FIELD

The present disclosure relates to the technical field of Internet of Vehicles (IoV), and in particular to a provisioning method and a terminal device.

BACKGROUND

In order to reduce the impact of the introduction of the Vehicle-to-Everything (V2X) technology on the production of enterprises, the initial security configuration of an IoV terminal should reduce the dependence on the secure environment and security capability of the production of enterprises as much as possible. Therefore, a simpler and effective method for V2X terminal identity authentication and information security interaction is needed to minimize the cost of upgrading the production line of enterprises.

An on-line initial security configuration scheme based on a Generic Bootstrapping Architecture (GBA) that is proposed by the Fifth Generation Automotive Association (5GAA) avoids a production mode of off-line filling of production line and pre-configuration of the X.509 digital certificate(s), which can save the cost of security reformation of the production environment in enterprises. However, the proposed scheme has the problem that a shared session key(s) (Ks_NAF) may be exposed when transmitted outside the secure environment and faces security risks such as a physical attack.

SUMMARY

Embodiments of the present disclosure provide a provisioning method and a terminal device to solve the problem in the related art that a session key(s) need(s) to be transmitted between a Universal Subscriber Identity Module (USIM) and a Hardware Security Module (HSM) of a terminal device, as a result, the session key(s) is/are transmitted outside a secure environment and may be vulnerable to physical attacks, and therefore, the security of provisioning cannot be guaranteed.

To solve the above problem, the embodiments of the present disclosure provide a provisioning method, which is applied to a terminal device, and may include the following operations.

A security module establishes a secure channel with a Certificate Authority (CA) server through one or more session keys shared by the security module and the CA server.

One or more digital certificates are obtained from the CA server.

The security module is to implement Universal Subscriber Identity Module (USIM) functions.

Optionally, when the CA server is an Enrollment Certificate Authority (ECA) server, the one or more digital certificates are one or more Enrollment Certificates (ECs). The operation of obtaining the one or more digital certificates from the CA server may include the following operations.

The security module generates one or more public and private key pairs for applying for the one or more ECs.

The one or more ECs are obtained from the ECA server with the one or more public and private key pairs.

Optionally, when the CA server is the ECA server, the one or more digital certificates are one or more ECs. After the one or more digital certificates are obtained from the CA server, the method may further include the following operation.

The one or more ECs are stored by the security module.

Further, when the CA server is a Pseudonym Certificate Authority (PCA) server, the one or more digital certificates are one or more Pseudonym Certificates (PCs). The operation of obtaining the one or more digital certificates from the CA sever may include the following operations.

The security module signs one or more PC application messages with the one or more private keys of the one or more ECs.

The one or more PCs are obtained from the PCA server according to the one or more PC application messages.

Specifically, the operation of obtaining the one or more PCs from the PCA server may include the following operation.

One or more feedback messages sent by the PCA server are received, the signature(s) of the received one or more feedback messages is/are verified with the one or more public keys of the PCA server, and the one or more PCs are obtained.

Specifically, after the one or more PCs are obtained from the PCA server, the method may further include the following operations.

The security module signs the one or more messages transmitted directly on PC5 interface with one or more private keys of the one or more PCs.

The signed one or more messages are sent to the external device.

Optionally, when the CA server is the ECA server, the one or more digital certificates are one or more ECs. After the one or more digital certificates are obtained from the CA server, the method may further include the following operations.

The one or more ECs are sent to the HSM by the security module.

The HSM stores the one or more ECs.

Further, the operation of obtaining the one or more digital certificates from the CA server may further include the following operations.

The HSM generates the one or more public and private key pairs for applying for the one or more ECs.

The HSM sends the one or more public keys for applying for the one or more ECs to the security module.

The security module obtains the one or more ECs from the ECA server with the one or more public keys.

Optionally, when the CA server is the PCA server, the one or more digital certificates are the one or more PCs, and the operation of obtaining the one or more digital certificates from the CA sever may include the following operations.

The one or more PCs are sent to the HSM by the security module.

The HSM stores the one or more PCs.

Further, the operation of obtaining the one or more digital certificates from the CA server may include the following operations.

The HSM generates the one or more public and private key pairs for applying for the one or more PCs.

The HSM sends the one or more public keys for applying for the one or more PCs to the security module.

The security module obtains the one or more PCs from the PCA server with the one or more public keys.

Further, after the one or more digital certificates are obtained from the CA server, the method may further include the following operations.

The security module sign the one or more messages transmitted directly on PC5 interface with one or more private keys of the one or more PCs.

The signed one or more messages are sent to the external device.

Specifically, a secure channel is established between the security module and the CA server through a Generic Bootstrapping Architecture based on a Universal Integrated Circuit Card (GBA_U).

The embodiments of the present disclosure also provide a terminal device, which may include a security module.

The security module is configured to: establish a secure channel with a CA server through one or more session keys shared by the security module and the CA server; and
obtain one or more digital certificates from the CA server.

The security module is to implement Universal Subscriber Identity Module (USIM) functions.

The embodiments of the present disclosure also provide a terminal device, which may include a transceiver and a processor.

The processor is configured to:
control a security module to establish a secure channel with a CA server through one or more session keys shared by the security module and the CA server; and
obtain one or more digital certificates from the CA server.

The security module is to implement Universal Subscriber Identity Module (USIM) functions.

The embodiments of the present disclosure also provide a computer-readable storage medium, in which a computer program may be stored. The program, when executed by the processor, implements the steps in the above provisioning method.

The present disclosure has the following beneficial effects.

By directly establishing a secure channel between a security module that can implement USIM functions and a CA server, and obtaining a session key(s) and a digital certificate(s) from the CA server through the secure channel, the above solution prevents the session key(s) used for applying for the digital certificate(s) from being transmitted in an environment other than the secure channel, thereby reducing the probability of the session key(s) being subjected to physical attacks, reducing the security risk, and improving the security of provisioning.

DETAILED DESCRIPTION

The technologies related to the embodiments of the present disclosure are briefly introduced as follows.

At present, off-line filling of a production line is a primary method for realizing initial security configuration of V2X terminal devices (including an On Board Unit (OBU), a Road Side Unit (RSU), etc.), which can perform provisioning to Hardware Security Modules (HSMs) of the devices. Here, a provisioning process of the OBU device before an automobile with a V2X function comes off a production line is described as an example. Other types of V2X terminals also have the similar process.

Figure 1:
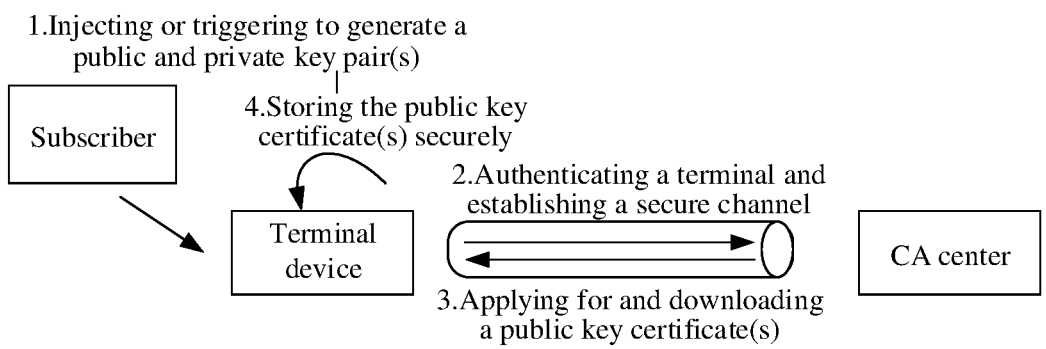
FIG. 1 is a schematic diagram of an autonomous mode of off-line filling of a production line.
Figure 2:
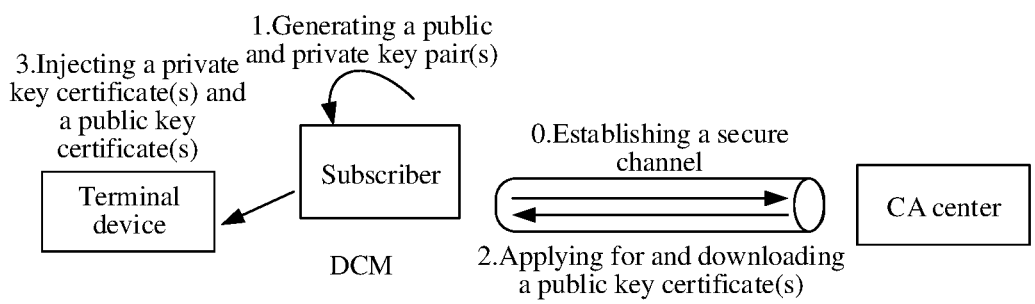
FIG. 2 is a schematic diagram of a Device Configuration Manager (DCM) agent mode of off-line filling of a production line.

According to different implementation methods, the off-line filling of a production line includes an autonomous mode and a DCM agent mode. The processes are shown in FIG. 1 and FIG. 2 respectively.

In the autonomous mode, a production line worker triggers, through an external device, an HSM of an OBU device to generate one or more public and private key pairs, or injects one or more public and private key pairs generated by an external cryptographic device into the HSM. At the same time, the production line injects address information and a digital certificate(s) of an Enrollment Certificate Authority (ECA) server. Then, the production line worker triggers the OBU device to access the ECA server. The OBU device uses the digital certificate(s) of the ECA server to authenticate its identity and establishes a secure communication channel between them. Finally, under the protection of the secure channel, the OBU device uploads one or more public keys to the ECA server, applies for and downloads a digital EC(s), and stores the same securely in the HSM.

The working principle of the DCM agent mode is basically the same as that of the autonomous mode, but the implementation process is different. In the DCM agent mode, the production line needs to deploy a DCM agent node, and performs mutual authentication with the ECA server in advance to establish the secure communication channel, and provides uniform services for all vehicles coming off the production line. In the process of initial security configuration, the DCM generates the one or more public and private key pairs for the OBU device and interacts with the ECA server instead of the OBU device to apply for and download the one or more digital ECs. Finally, the DCM securely injects the generated one or more public and private key pairs, the obtained one or more digital ECs, and the one or more certificates and address information of the ECA server into the HSM of the OBU, thereby completing the initial security configuration of the OBU device.

The 5GAA proposes an initial security configuration method for a V2X terminal device based on a GBA technology in the research report "Efficient Provisioning System Simplifications". In the method, a USIM and its code number (such as the International Mobile Subscriber Identification Number (IMSI), the Mobile Station International Subscriber Directory Number (MSISDN) and the Integrate Circuit Card Identity (ICCID)) are used as the identity of the V2X terminal device at the initial time to represent the device identity. Based on the USIM, the V2X terminal device can access an operator network, perform bidirectional authentication and key negotiation with the network through an Authentication and Key Agreement (AKA) mechanism, and generate and provide a shared session key(s) Ks_NAF for applications. Finally, secure transmission channels, such as a TLS secure channel, can be established between the V2X device and the ECA server.

Figure 3:
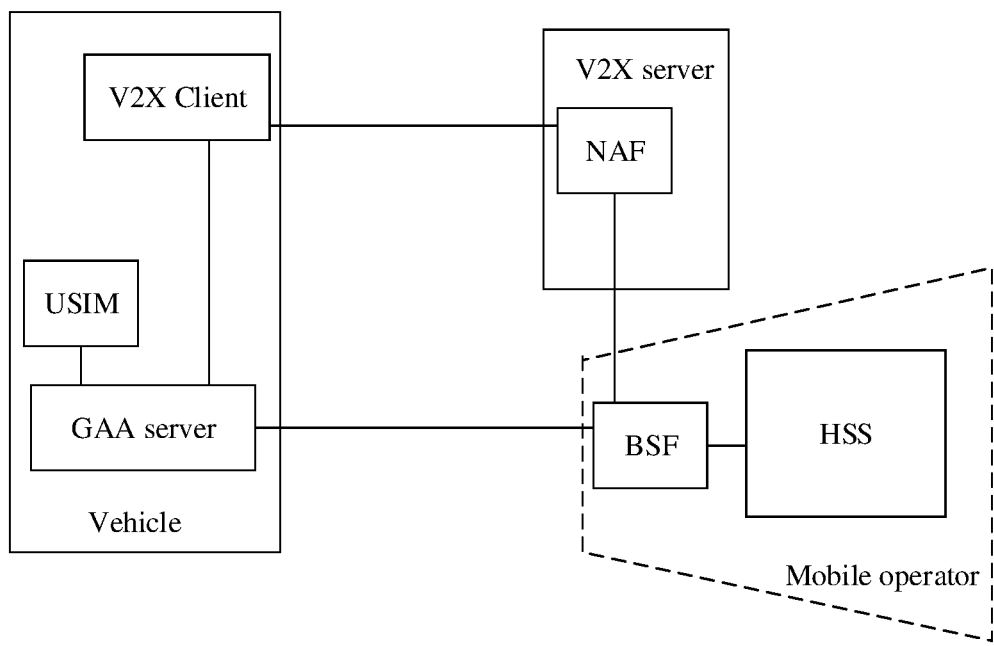
FIG. 3 is a schematic diagram of a GBA.

FIG. 3 gives a GBA, which consists of the following parts:

A11, software providing GBA capability support on the V2X terminal device, namely a GAA server;

A12, V2X client software on the V2X terminal device, which interfaces with the GAA server;

A13, a USIM communicating with the GAA server;

A14, a Network Application Function (NAF) software in the ECA server; and

A15, a Bootstrapping Server Function (BSF) core network element.

Based on the security authentication method of network GBA, the V2X terminal device may use a root key(s) in the USIM card to perform bidirectional identity authentication with a mobile cellular network through the AKA mechanism, and negotiate with the BSF to generate the shared session key(s) Ks_NAF. Then, when receiving a certificate application request(s) from the V2X terminal device, the ECA server may interact with the BSF to obtain the session key(s) Ks_NAF, and authenticate the identity of the V2X terminal device based on the Ks_NAF. After the identity authentication is approved, the ECA server accepts the EC application request(s) of the V2X terminal device and issues the digital EC(s) to the V2X terminal device upon approval. In the above process, application layer information interaction between the ECA server and the V2X terminal device is performed in a secure channel established based on the shared session key(s) Ks_NAF, so the security of message transmission can be guaranteed.

In the above solution based on the GBA, the USIM is used as the initial identity of the V2X terminal device, and without pre-configuring any security credentials (such as the X.509 digital certificate(s)), the secure channel between the V2X terminal device and the ECA server can be established through the mobile cellular network to complete the provisioning of the device online. In the solution, operations and interactions related to the initial security configuration are performed by the V2X terminal device itself without the need of relying on the secure environment of the production line to ensure the security of configuration operations as in the off-line filing mode, thus greatly reducing the cost of upgrading the production line of enterprises.

In addition, the method can be applied to a scenario where the place of automobile production and the place of automobile sales are not in the same region. Through the network configuration, an OBU terminal is allowed to access the ECA server at the place where the automobile is sold and used, thereby solving the problem of determining the place of the ECA server of which an X.509 digital certificate(s) is/are pre-configured for the OBU terminal in an automobile production process.

In the process of identity authentication and establishment of a secure channel, the code number in the USIM may be used as the unique identity of the V2X device, which avoids the situation in which the identity of the V2X terminal device has not been authenticated and the V2X terminal device cannot be authenticated only based on the X.509 digital certificate(s) of the ECA server.

In "Technical Specification of Communication (Pseudonym) Certificate Management Based on Cooperative Vehicle Infrastructure System" being discussed by China ITS Industry Alliance, a method for a V2X terminal device (including the OBU, the RSU, etc.) to apply for one or more PCs is proposed. The general idea of this method is that Transport Layer Security (TLS) is recommended for the identity authentication and the establishment of the TLS secure channel between a PCA server and the V2X terminal device, and then the V2X terminal device interacts with the PCA server through the TLS secure channel to apply for the digital PC(s). In the draft specification, the sections related to applying for the one or more PCs are described as follows.

The specification is applicable to a scenario where an On Board Unit (OBU) or a Road Side Unit (RSU) with a valid EC(s) issued by the ECA applies for a communication (pseudonym) certificate(s) from the Authorization Certificate Authority (ACA) for information interaction with the RSU or the OBU, so as to obtain relevant information services and have the capability to verify the signature of the obtained information. In addition, the specification is also applicable to a scenario where an OBU applies for the communication (pseudonym) certificate(s) from the ACA and communicates with other OBUs.

An Application Programming Interface (API) in the specification uses Hypertext Transfer Protocol over Secure Socket Layer (HTTPS), specifically it is suggested to use at least the version of TLS 1.2, and the version of TLS 1.3 is recommended, supports a standard HTTPS Transport Control Protocol (TCP) 443 port, and uses the X.509 certificate(s) to perform the identity authentication among components.

Here, the ACA refers to an organization that manages the communication (pseudonym) certificate(s), namely the PCA in the present application.

Figure 4:
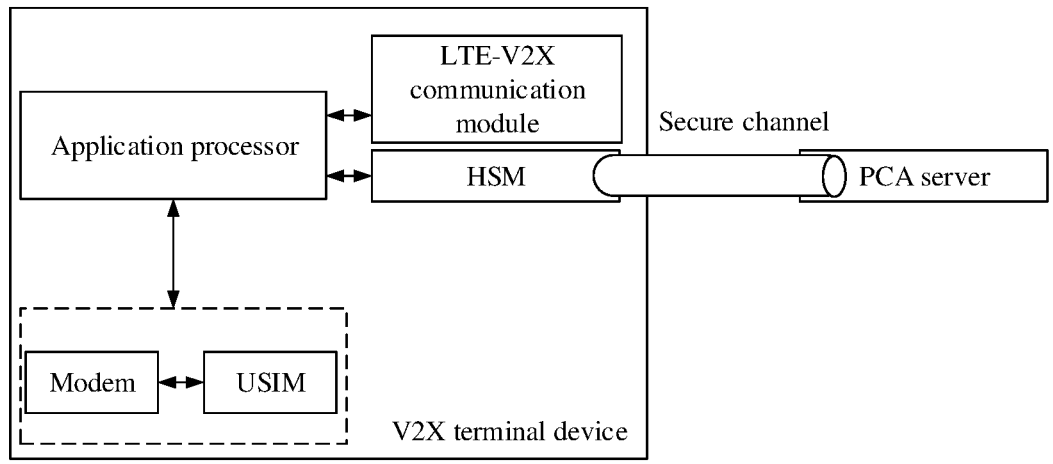
FIG. 4 is an architecture diagram of applying for a PC(s) based on Transport Layer Security (TLS).

In order to ensure the security of a process of applying for and obtaining the one or more PCs, on the V2X terminal device, the TLS scheme may be implemented using the scheme shown in FIG. 4. The X.509 device certificate(s) is/are pre-configured for the V2X terminal device in the HSM, and the TLS secure channel is established between the HSM and the PCA server to ensure communication security. The public and private key pair(s) related to the one or more PCs are generated in the secure environment of the HSM. Through the TLS secure channel, a public key(s) and device information are reported, and the digital PC(s) is/are applied for, downloaded, and stored securely. The whole scheme is conducted in a secure environment to ensure the security of the whole process.

The 5GAA proposes an initial security configuration method for a V2X terminal device based on a GBA technology in the research report "Efficient Provisioning System Simplifications". If the method is applied to applying for the one or more PCs, the pre-configuration of the X.509 certificate(s) can be avoided and then the cost of production line reformation can be reduced.

The related art has the following disadvantages.

Because a secure initialization process of the V2X terminal device involves the provisioning of sensitive parameters and information such as keys and digital certificates, the process has very strict requirements for security, and it is necessary to ensure the security of production environment, terminal device, message exchange and other links.

1.1 Off-Line Filling of a Production Line

The initial security configuration method for the off-line filling of production line needs to generate the public and private key pair(s) outside the V2X terminal device and even apply for the digital EC(s) by an agent, which puts forward high security requirements on the production environment of an automobile enterprise or a V2X terminal device supplier (depending on who completes the initial security configuration). Enterprises have to invest a lot of time and cost to upgrade the production line and train the production line workers to meet the production safety requirements in compliance, audit, management and control and other aspects.

At present, powerful foreign automobile enterprises have deployed a secure production environment for production by means of off-line filling. However, most of Chinese domestic automobile enterprises do not have such a secure production environment. If they are required to also use off-line filling for production, great cost will be brought to the enterprises. Therefore, a simpler and securer solution is needed.

1.2 On-Line Configuration of EC(s) Based on GBA Technology

The current implementation scheme on the V2X terminal device side proposed by the 5GAA has security vulnerabilities and has a security risk of physical attack on the shared session key(s) Ks_NAF. The specific reasons are as follows.

In order ensure the security of the initial security configuration of the V2X terminal device, it is generally required that the sensitive security parameters and information (such as the public and private key pair(s), the shared key(s), and various intermediate key(s)) involved in the process are processed in the local secure environment of the device and cannot leave the local secure environment of the terminal in its life cycle. The local secure environment of the terminal is usually provided by hardware modules that reach a certain security level through assessment, such as the USIM and the HSM. In addition, to realize the security of external communication of the V2X terminal device, it is needed to ensure the security of message transmission. Corresponding to the process of initial security configuration of the V2X terminal device, it is required that the V2X terminal device and the ECA server communicate through a secure communication channel, and the secure channel should terminate in a security module of the device on the terminal side, to ensure that all information is interacted in the secure environment.

In the implementation scheme proposed in a report of the 5GAA, the HSM is an object of the initial security configuration of the V2X terminal device. The one or more public and private key pairs used to apply for the one or more ECs is generated by the HSM. The TLS secure channel is established between the HSM and the ECA server using the shared session key(s) Ks_NAF generated by the USIM based on the GBA technology. However, due to the limitation of the V2X terminal device architecture, the USIM is an independent security entity outside the HSM, so the USIM needs to pass the shared session key(s) Ks_NAF generated by the GBA mechanism to the HSM through a transmission channel outside the secure environment. In this way, the shared session key(s) Ks_NAF is exposed outside the secure environment, especially after passing an Application Processor (AP), and it faces the physical attacks and other security risks. Once the shared session key(s) Ks_NAF for establishing the secure channel is leaked during transmission, the security of message exchange between the V2X terminal device and the ECA server cannot be guaranteed.

Due to the above security risks, enterprises need to conduct a security assessment on the risks when choosing a technical scheme, and may use a GBA initial security configuration scheme only if the risks are controllable, which greatly limits the application scope of the scheme.

In addition, when the GBA scheme proposed by the 5GAA is implemented on the terminal, the HSM is responsible for generating the one or more public and private key pairs, establishing the TLS secure channel, applying for, downloading and storing the EC(s), and the USIM is responsible for generating the related session key(s) based on the GBA technology. The cost of terminal implementation is high. The terminal is required to support both the USIM and the HSM, and the security hardware of the HSM is expensive, so the cost of terminal implementation is high.

For the above deficiencies, a more straightforward solution is to integrate the USIM and the HSM into the same physical module or chip to avoid exposure during key transmission and improve the security. However, at present, such a terminal chip or module product is not available and cannot be realized on the V2X terminal device.

1.3 PC Deployment Scheme Based on TLS

"Technical Specification of Communication (Pseudonym) Certificate Management Based on Cooperative Vehicle Infrastructure System" proposes that the digital PC is applied for the V2X terminal device by means of the TLS, and the X.509 certificate(s) is/are required to establish the secure channel between the V2X terminal device and the PCA server. This means that the automobile enterprise or the V2X terminal device supplier needs to pre-configure the X.509 digital certificate(s) for the V2X terminal device, which brings a requirement for upgrading the production line. At the same time, because the pre-configuration of the X.509 digital certificate(s) involve(s) the configuration of the sensitive security information such as keys, the process has strict requirements on the secure production environment, which brings a large cost to the enterprise for upgrading the production line.

1.4 On-Line Deployment of PC(s) Based on GBA Technology

Figure 5:
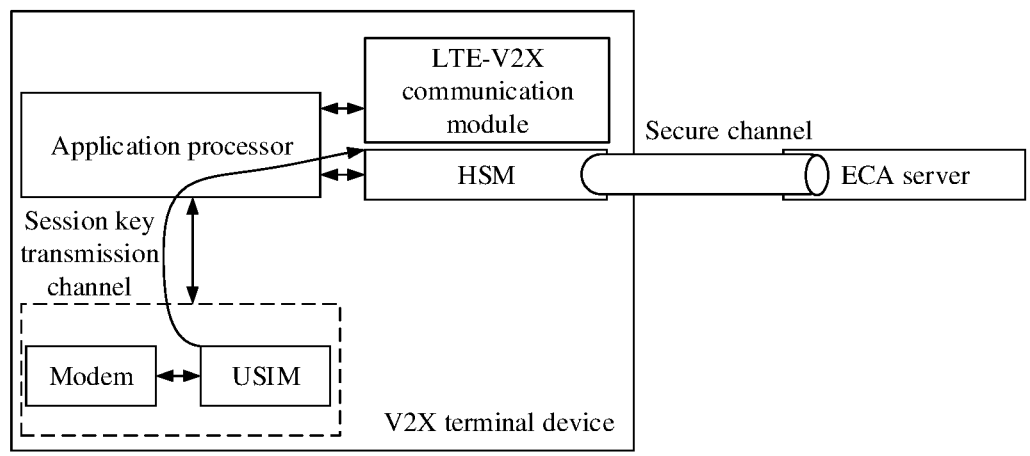
FIG. 5 is a schematic diagram of security risks in terminal implementation based on a GBA in the related art.
Figure 6:
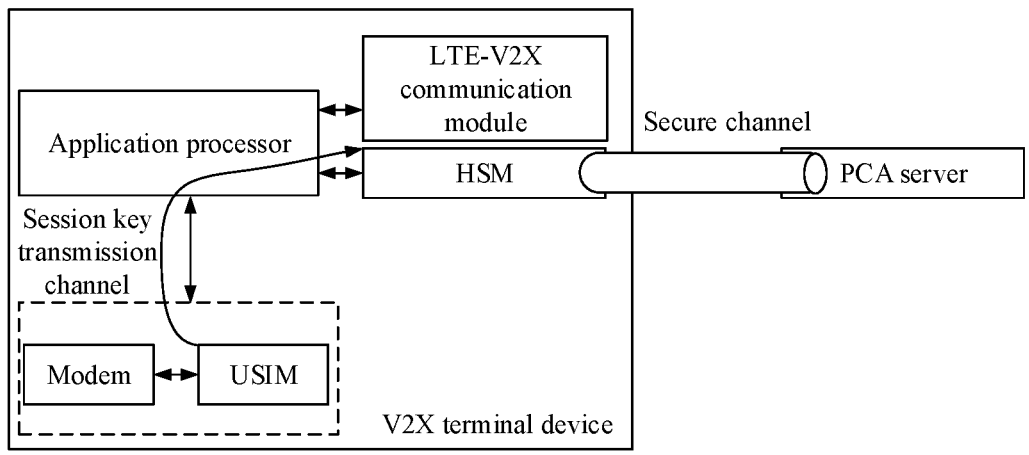
FIG. 6 is a schematic diagram of security risks when a configuration scheme based on a GBA that is proposed by the 5GAA is used for PC application.

The provisioning method based on the GBA which is proposed by the 5GAA in the research report "Efficient Provisioning System Simplifications" is mainly used for the provisioning of the one or more ECs. The method is mainly used for completing the provisioning of the EC(s), and is not designed for the initial application of the one or more PCs. If the method is applied to applying for the one or more PCs, the terminal may have the potential security risks such as a physical attack. Similar to the problem shown in FIG. 5, the shared session key(s) Ks_NAF will be exposed outside the secure environment during transmission, and there is a security risk that the Ks_NAF is tampered with and leaked, as shown in FIG. 6.

For the problem in the related art that the session key(s) needs to be transmitted between the USIM and the HSM of a terminal device, as a result, the session key(s) is/are transmitted outside a secure environment and may be vulnerable to a physical attack, the present disclosure provides a provisioning method and a terminal device.

For making the purpose, technical solutions and advantages of the present disclosure clearer, the present disclosure is described in details below in combination with the accompanying drawings and the specific embodiments.

Figure 7:
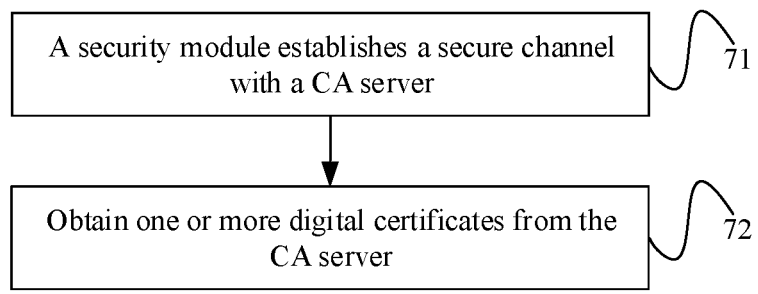
FIG. 7 is a flowchart of a provisioning method according to an embodiment of the present disclosure.

As shown in FIG. 7, the provisioning method of the embodiments of the present disclosure is applied to a terminal device, and may include the following operations.

A security module establishes a secure channel with a CA server through one or more session keys shared by the security module and the CA server.

One or more digital certificates are obtained from the CA server.

It is to be noted that the security module in the embodiments of the present disclosure is to implement USIM functions, that is, when the security module only realizes the USIM functions, it is the USIM. Optionally, when the security module is further to implement functions of the USIM and an HSM, it indicates that the USIM and the HSM are integrated in the terminal device, and it may also be understood that the terminal device has the HSM that can implement the USIM functions.

It is to be noted that in this mode, the secure channel is directly established between the security module that can implement the functions of the USIM and the CA server, and during applying for the digital certificate(s), the USIM directly uses the session key(s) to encrypt and protect an application message(s), without the need of sending the session key(s) to the HSM. Therefore, the session key(s) do(es) not have to be exposed outside the secure environment, thereby reducing the probability of the session key(s) being subjected to physical attacks.

It is to be noted that the terminal device mentioned in the embodiments of the present disclosure is a V2X terminal device based on the GBA technology, which may be an OBU, an RSU, a wearable device for pedestrian and other types of V2X terminal devices and IoV terminal devices. The problem that the shared session key(s) (Ks_NAF) generated by GBA-based negotiation is transmitted outside the local secure environment of the terminal can be solved, and the security risks such as a physical attack can be eliminated.

It is to be noted that the embodiment may be used for applying for either an EC(s) or a PC(s). When the one or more digital certificates are one or more ECs, the CA server is an ECA server. When the one or more digital certificates are one or more PCs, the CA server is a PCA server.

For example, if the security module is a USIM, the specific implementation processes of applying for the one or more ECs and the one or more PCs are described below respectively.

First, Applying for the One or More ECs

Figure 8:
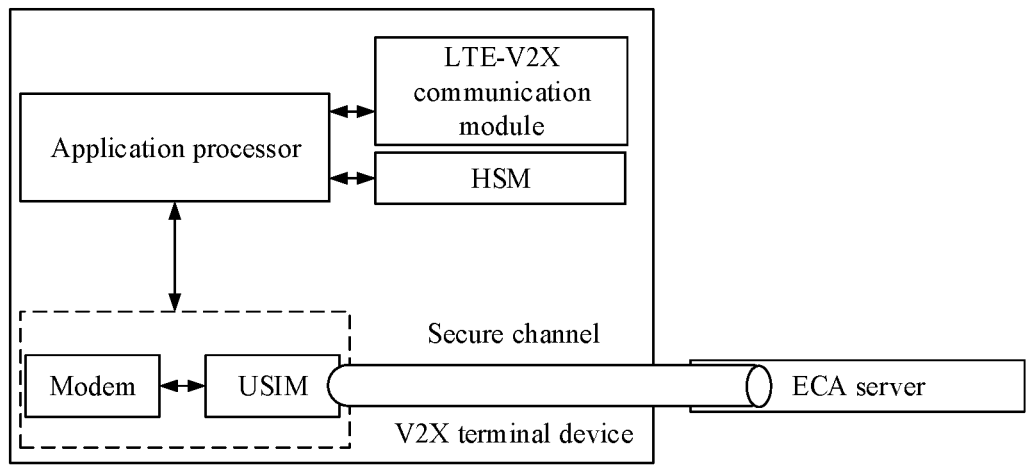
FIG. 8 is a schematic diagram of a security implementation architecture based on a GBA for applying for one or more ECs according to embodiments of the present disclosure.

FIG. 8 shows a schematic diagram of security implementation architecture based on a GBA. The V2X terminal device includes: an application processor (AP), an LTE-V2X communication module connected to the AP, and an LTE-Uu communication module connected to the AP. The LTE-Uu communication module includes: a modem and a USIM. Specifically, a secure channel is established between the USIM and the ECA server, and the one or more ECs are obtained from the ECA server through the secure channel Here, it is to be noted that, in this case, the HSM may or may not exist. Generally, the HSM can be omitted to reduce the production cost of the terminal device.

Specifically, before the one or more ECs are obtained from the ECA server, the USIM also needs to generate one or more public and private key pairs for applying for the one or more ECs, so as to use the one or more public and private key pairs to obtain the one or more ECs from the ECA server. After the one or more ECs are obtained, the USIM is further configured to store the one or more ECs.

Specifically, a GBA secure channel is established between the USIM and the ECA server by means of the a GBA based on a Universal Integrated Circuit Card (UICC) (GBA_U). It is to be noted that the GBA_U scheme can make the shared session key(s) Ks_NAF or a derived next-level key(s) completely be generated, stored and used by the USIM, and ensure that the secure channel between the V2X terminal device and the ECA server terminates inside the USIM on the terminal side, which eliminates the security risks such as a physical attack brought by the method in the related art that in which the shared session key(s) Ks_NAF or the derived next-level key(s) is/are transmitted to the HSM through an insecure environment.

It is to be noted that the terminal device may also send direct communication service messages. Specifically, the USIM signs a message(s) transmitted directly on PC5 interface with the one or more private keys of the one or more ECs, and sends the signed message(s) transmitted directly on PC5 interface to other devices (e.g., an external device).

That is, in this case, the USIM is used as a local security module to implement the initial security configuration of the V2X terminal device. The USIM generates, stores and uses the session key(s) and the one or more public and private key pairs, and applies for, stores, and uses the one or more ECs. The USIM is a multi-functional security entity at a security level of EAL 4+ and has functions such as random number generation, cryptographic algorithm operation, and secure storage, so it has the capability of securely implementing the initial security configuration of the V2X terminal device.

In the scheme, the V2X terminal device triggers the USIM to generate the one or more public and private key pairs used for applying for the one or more ECs. After that, the V2X terminal device invokes the supported GBA security authentication capability, accesses the ECA server through a mobile cellular network and generates a shared session key(s) Ks_NAF by negotiation with the ECA server, and establishes an initial security trust relationship with the ECA server. The ECA server verifies whether the identity of the V2X terminal device is valid according to the shared session key(s) Ks_NAF. After the verification succeeds, the ECA server establishes a secure transmission channel with the V2X terminal device to ensure the security of data interaction between them. The secure channel may be established using the session key(s) Ks_NAF or the next-level session key(s) derived from the Ks_NAF. The derived key(s) is/are calculated in a secure environment of the USIM.

To sum up, in this case, the main responsibilities of the USIM of the terminal device include:

B11, establishing a GBA secure channel with an ECA server, preferentially, by means of the GBA_U;

B12, generating one or more public and private key pairs for applying for an EC;

B13, interacting with the ECA server through the GBA secure communication channel, and applying for and downloading a digital EC(s) and a certificate(s) of the ECA server; and B14, storing the one or more ECs and the related one or more public and private key pairs locally and securely.

Second, Applying for the One or More PCs

It is to be noted that, in this case, the V2X terminal device includes: an AP, a LTE-V2X communication module connected to the AP, and an LTE-Uu communication module connected to the AP. The LTE-Uu communication module includes: a modem and a USIM. Specifically, a secure channel is established between the USIM and the PCA server, and one or more PCs are obtained from the PCA server through the secure channel. Here, it is to be noted that, in this case, the HSM may or may not exist. Generally, the HSM can be omitted to reduce the production cost of the terminal device.

Specifically, before the one or more PCs are obtained from the PCA server, the USIM further needs to generate one or more public and private key pairs for applying for the one or more PCs, so as to use the one or more public and private key pairs to obtain the one or more PCs from the PCA server. After the one or more PCs are obtained, the USIM is further configured to store the one or more PCs.

It is to be noted that the one or more ECs are used for verifying the identity of the V2X terminal device, and signing for protection one or more PC application messages to apply for the one or more PCs. Specifically, the USIM uses the one or more private keys of the one or more ECs to sign the one or more PC application messages, and then obtains the one or more PCs from the PCA server according to the one or more PC application messages. In other words, applying for the one or more PCs must be based on the EC(s), that is, the terminal device has applied for and obtained the one or more ECs before applying for the one or more PCs. After obtaining the one or more ECs securely, the V2X terminal device interacts with the PCA server to further apply for the digital PC(s). In this process, the V2X terminal device should sign a sent PC application request message(s), and verifies the signature of a received PC application response message(s), so as to ensure the authenticity and integrity of the message(s). According to the requirements in protocols in the related art, the one or more PC application messages should be signed with the one or more private keys of the one or more ECs. In order to ensure the security of usage of the one or more private keys of the one or more ECs, the embodiments of the present disclosure propose that the USIM performs the signature protection for the one or more PC application messages, so as to eliminate the potential security risks such as a physical attack brought by the transmission of the one or more private keys of the one or more ECs between the USIM and the HSM. For security and simplicity, the signature of the one or more PC application response messages may also be verified by the USIM.

The USIM has the capability of performing dozens to hundreds times of signature/signature verification processing per second, while the processing of the one or more PC application messages does not have a high real-time requirement, so using the USIM for the above processing can fully meet the requirements on performance of applying for the one or more PCs.

After the V2X terminal device completes the initial security configuration and obtains the digital EC(s), it needs to use the digital EC(s) to further apply for the digital PC(s) to protect the security of the messages transmitted directly on PC5 interface.

According to the protocols in the related art, when applying for the digital PC from the PCA server, the V2X terminal device needs to use the one or more ECs to prove validity of its identity and use the one or more private keys of the one or more ECs to sign the one or more PC application messages, so as to ensure the authenticity of the message(s).

Further, when receiving a feedback message(s) sent by the PCA server (for example, the feedback message(s) is/are a response message(s) to the certificate application), the V2X terminal device needs to use the one or more public keys of the PCA server to verify the signature(s) of the received feedback message(s) to obtain the one or more PCs.

In order to ensure the security of obtaining and configuring of the digital PC(s) and prevent potential physical security risks, all keys should be ensured to be processed in the local secure environment of the V2X terminal device, and the shared session key(s) Ks_NAF generated based on the GBA technology should be prevented from being transmitted between the USIM and other security modules (such as the HSM).

Therefore, the embodiments of the present disclosure proposes that the USIM is used as the local security module to implement the initial security configuration of the V2X terminal device, and the USIM generates, stores and uses the session key(s) and the public and private key pair(s), and applies for, stores, and uses the one or more PCs. The USIM is a multi-functional security entity at security level of EAL 4+ and has functions such as random number generation, cryptographic algorithm operation, and secure storage, so it has the capability of securely implementing the initial security configuration of the V2X terminal device.

In the embodiments of the present disclosure, the V2X terminal device triggers the USIM to generate the one or more public and private key pairs used for applying for the one or more PCs. After that, the V2X terminal device invokes the supported GBA security authentication capability, accesses the ECA server through a mobile cellular network and generates the shared session key(s) Ks_NAF by negotiation with the ECA server, to establish an initial security trust relationship with the PCA server. The PCA server verifies whether the identity of the V2X terminal device is valid according to the shared session key(s) Ks_NAF. After the verification succeeds, the PCA server establishes a secure transmission channel with the V2X terminal device to ensure the security of data interaction between them. The secure channel may be established using the session key(s) Ks_NAF or the next-level session key(s) derived from the Ks_NAF. The derived key(s) is/are calculated in a secure environment of the USIM.

In the embodiments of the present disclosure, the USIM is used to generate the public and private key pair(s) required for applying for the digital PC(s), and a secure communication channel between the USIM and the PCA server is established by means of the GBA_U preferentially. Through the GBA secure channel, the USIM interacts with the PCA server, applies for the digital PC(s), downloads the certificate(s) of the PCA server, and stores the downloaded digital certificate(s) and public and private key pair(s) in the USIM locally and securely.

The one or more PC application messages exchanged between the V2X terminal device and the PCA server should be digitally signed using the one or more private keys of the one or more ECs stored in the USIM.

Considering the low sending rate of the PC5 interface (namely a direct link interface) direct communication service message(s) of the IoV, which is about 10 messages per second, the USIM can meet the requirement for signing the sent message(s) in real time. Therefore, the embodiments of the present disclosure propose to use the USIM to sign for protection the message(s) transmitted directly on PC5 interface, that is, when sending the message(s) transmitted directly on PC5 interface, the AP of the terminal first sends the message(s) to the USIM, and then the USIM sends the message(s) through the LTE-V2X communication module after signing the message(s) with one or more private keys of the one or more PCs. At the same time, in order to reduce the delay of sending the message(s) transmitted directly on PC5 interface, the USIM may send the obtained digital PC(s) to an external module or chip (such as an AP, an HSM, and an LTE-V2X communication module), so that the one or more PCs can be sent along with the message(s) transmitted directly on PC5 interface, thereby realizing the point-topoint distribution of the digital certificate(s) between an automobile and an automobile and between an automobile and an RSU.

The embodiments of the present disclosure may ensure that all keys (such as the one or more private keys of the one or more ECs, the one or more public and private keys of the one or more PCs, the shared session key(s) Ks_NAF generated based on GBA negotiation or the derived next-level key) and cryptography calculation related to applying for the one or more PCs are processed in the secure environment of the USIM, and the GBA secure channel terminates in the secure environment of the USIM. Therefore, the processes of applying for, transmitting, processing and storing the one or more PCs are secure, avoiding the potential physical attack and other security risks in the scheme of the 5GAA. Because the digital PC(s) is/are allowed to be disclosed, sending the one or more PCs to an external module or chip for processing does not affect the security of the scheme.

To sum up, in this case, the main responsibilities of the USIM of the terminal device include:
- B21, establishing the GBA secure channel with the PCA server, preferentially, by means of the GBA_U;
- B22, generating the one or more public and private key pairs for applying for the one or more PCs;
- B23, interacting with the PCA server through the GBA secure communication channel, and applying for and downloading the digital PC(s) and the certificate(s) of the PCA server. In this process, the one or more private keys of the one or more ECs are used to sign the one or more PC application messages, and the one or more public keys of the one or more certificates of the PCA server is used to verify the signature(s) of the received message(s);
- B24, storing the digital PC(s) and the related public and private key pair(s) locally and securely;
- B25, signing the sent message(s) transmitted directly on PC5 interface with private key(s) corresponding to the PC(s);
- B27, sending the PC(s) to the external module or chip; and
- B28, signing and verifying the signature(s) of the one or more PC application message(s).

It is to be noted that, in order to facilitate compatibility with an implementation scheme of automobile industry terminal in the related art, the embodiments of the present disclosure also provide a method for securely applying for the certificate(s) based on the GBA technology when the HSM generates, stores and uses the key(s), so as to extend the applicability of the embodiments of the present disclosure. It is to be noted that, in this case, the security module merely implements the USIM functions, that is, the security module is a USIM.

Specifically, after obtaining the one or more digital certificates from the CA server, the USIM sends the one or more digital certificates to the HSM, and the HSM stores the one or more digital certificates. It is also to be noted that before applying for the one or more digital certificates, the HSM needs to first generate the public and private key pair(s) for applying for the digital certificate(s) and store the same; then, the HSM sends the public key(s) for applying for the digital certificate(s) to the USIM, and the USIM uses the public key(s) to apply for and obtain the digital certificate(s) from the CA server. In this case, the HSM sends the direct communication service message(s). Specifically, the HSM first uses the private key(s) of the digital certificate(s) to sign the message(s) transmitted directly on PC5 interface, and then sends the signed message(s) transmitted directly on PC5 interface to other devices.

The specific implementation processes of applying for the one or more ECs and the one or more PCs are respectively described below.

First, Applying for the One or More PCs

In this case, the HSM is used to generate the one or more public and private key pairs required for applying for the one or more PCs, and the secure communication channel between the USIM and the PCA server is established by means of the GBA_U preferentially. When applying for the one or more PCs, the HSM sends the generated one or more public keys of the one or more digital PCs to the USIM, and then the USIM interacts with the PCA server to apply for the one or more digital PCs and download the one or more certificates of the PCA server. After that, the USIM sends the downloaded one or more PCs and the one or more certificates of the PCA server to the HSM for secure storage. In the process of applying for the one or more certificates, the USIM uses the one or more private keys of the stored one or more ECs to digitally sign the one or more PC application messages.

In order to reduce the delay of sending the message(s) transmitted directly on PC5 interface, the USIM/HSM may also send the obtained one or more PCs to another external module or chip (such as an AP and an LTE-V2X communication module), so that the one or more PCs can be sent along with the message(s) transmitted directly on PC5 interface, thereby realizing the point-to-point distribution of the digital certificate(s) between an automobile and an automobile and between an automobile and an RSU.

When sending the message(s) transmitted directly on PC5 interface, the V2X terminal device sends the message(s) to the HSM, and then the HSM uses the private keys of the digital PCs to sign the message(s) and sends the signed message(s) through the LTE-V2X communication module.

Figure 9:
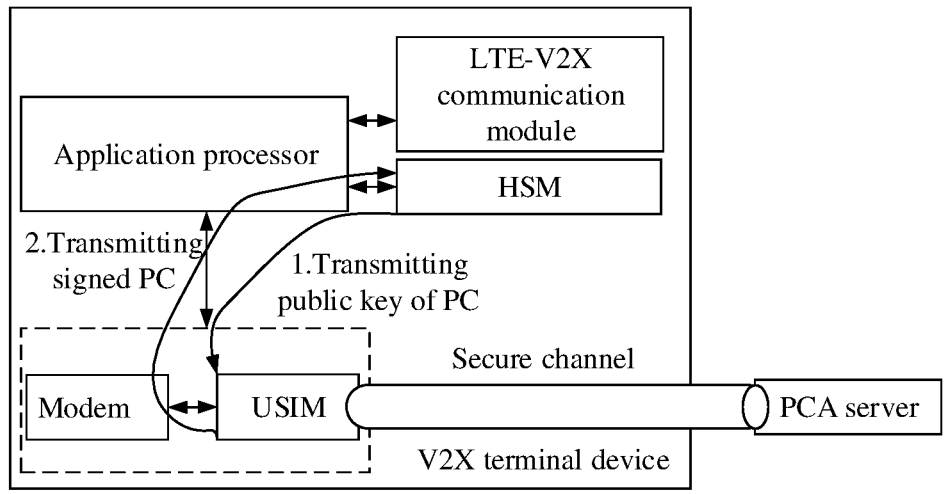
FIG. 9 is a schematic diagram of a security implementation architecture based on a GBA for applying for a PC(s) according to embodiments of the present disclosure.

As shown in FIG. 9, in this case, the public key(s) of the PC(s) is/are transmitted from the HSM to the USIM. Because public key(s) is/are allowed to be disclosed, there is no risk of leakage of the public key(s), which improves the security.

To sum up, in this case, the main responsibilities of the USIM of the terminal device include:
- C11, establishing the GBA secure channel with the PCA server, preferentially by means of the GBA_U;
- C12, receiving the public key(s) of the PC(s) sent by the HSM, and applying for the digital PC(s) for it;
- C13, interacting with the PCA server through the GBA secure communication channel, and applying for and downloading the digital PC(s) and the certificate(s) of the PCA server. In this process, the private key(s) of the EC(s) is/are used to sign the one or more PC application messages, and the public key(s) of the certificate(s) of the PCA server is/are used to verify the signature of the received message(s); and
- C14, sending the digital PC(s) and the certificate(s) of the PCA server to the HSM.

To sum up, in this case, the main responsibilities of the HSM of the terminal device include:
- C21, generating the one or more public and private key pairs for applying for the one or more PCs;
- C22, sending the generated one or more public keys to the USIM for applying for the one or more digital PCs;
- C23, storing the received one or more digital PCs and the related one or more public and private key pairs locally and securely; and C24, using the one or more private keys of the one or more PCs to sign the sent message(s) transmitted directly on PC5 interface.

Second, Applying for the One or More ECs

In this case, the HSM is used to generate the one or more public and private key pairs required for applying for the one or more ECs, and the secure communication channel between the USIM and the ECA server is established, preferentially by means of the GBA_U. When applying for the one or more ECs, the HSM sends the generated one or more public keys of the one or more digital ECs to the USIM, and then the USIM interacts with the ECA server to apply for the one or more digital ECs and download the one or more certificates of the ECA server. After that, the USIM sends the downloaded one or more ECs and one or more certificates of the ECA server to the HSM for secure storage.

In order to reduce the delay of sending the message(s) transmitted directly on PC5 interface, the USIM/HSM may also send the obtained EC(s) to another external module or chip (such as an AP and an LTE-V2X communication module), so that the one or more ECs can be sent along with the message(s) transmitted directly on PC5 interface, thereby realizing the point-to-point distribution of the digital certificate(s) between an automobile and an automobile and between an automobile and an RSU.

When sending the message(s) transmitted directly on PC5 interface, the V2X terminal device sends the message(s) to the HSM, and then the HSM uses the one or more private keys of the one or more digital ECs to sign the message(s) and sends the message(s) through the LTE-V2X communication module.

In this case, the public key(s) of the EC(s) is/are transmitted from the HSM to the USIM. Because the public key(s) is/are allowed to be disclosed, there is no security risk of leakage of the public key(s), which improves the security.

To sum up, in this case, the main responsibilities of the USIM of the terminal device include:

D11, establishing the GBA secure channel with the ECA server, preferentially by means of the GBA_U;

D12, receiving the one or more public keys of the one or more ECs sent by the HSM, and applying for the one or more ECs for the HSM;

D13, interacting with the ECA server through the GBA secure communication channel, and applying for and downloading the one or more ECs and the one or more certificates of the PCA server; and D14, sending the one or more ECs and the one or more certificates of the ECA server to the HSM.

To sum up, in this case, the main responsibilities of the HSM of the terminal device include:

D21, generating the one or more public and private key pairs for applying for the one or more ECs;

D22, sending the generated one or more public keys to the USIM for applying for the one or more ECs;

D23, storing the received one or more ECs and related one or more public and private key pairs locally and securely;

D24, using the one or more private keys of the one or more ECs to sign the sent message(s) transmitted directly on PC5 interface.

To sum up, the initial security configuration of the V2X terminal device needs to complete the following operations:

first, generating the one or more public and private key pairs, and preparing for applying for the EC(s)/PC(s);

second, establishing the secure channel to the ECA/PCA server, and using the generated the public key(s) to apply for the EC(s)/PC(s) from the ECA/PCA server;

third, downloading the EC(s)/PC(s) issued by the ECA/PCA server and the digital certificate(s) of the ECA/PCA server; and fourth, storing for use the one or more public and private key pairs, the one or more digital certificates, etc. locally and securely.

Figure 10:
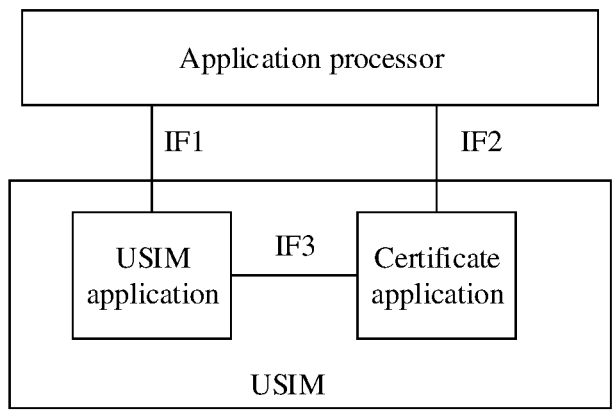
FIG. 10 is a diagram of an architecture of a USIM according to embodiments of the present disclosure.

In order to meet the requirements of applying for the certificate(s), the USIM needs to be added with a certificate application function module and related interfaces, and its architecture is shown in FIG. 10.

An interface IF1 and an application function of the USIM are used for implementing a GBA process.

Interfaces IF2 and IF3 and the certificate application function are used for applying for the EC(s)/PC(s) and signing the PC5 message(s).

An interaction process in the USIM card is as follows.

Applying for the digital certificate(s) (high security):

first, the certificate application module generates a public and private key pair(s), constructs a certificate request message(s), and requests, through the interface IF3, the USIM application module for using the Ks_NAF generated by using the GBA or the derived next-level key(s) to encrypt the certificate request(s);

second, after the certificate request(s) is/are encrypted, the certificate application module sends, through the interface IF2, the protected certificate request(s) to the ECA/PCA server through the AP to apply for the digital EC(s)/PC(s);

third, the digital certificate(s) issued by the ECA/PCA server and the certificate(s) of the ECA/PCA server are sent to the certificate application module through the interface IF2, and the certificate application module invokes the interface IF3 to request the USIM application module to use the Ks_NAF or the derived next-level key(s) for decrypting and verifying the message(s);

fourth, if the verification succeeds, the certificate application module stores the decrypted EC(s)/PC(s) and the certificate(s) of the ECA/PCA server securely and feeds back a processing result.

Applying for the digital PC(s) (high compatibility):

first, the certificate application module receives, through the interface IF2, the public key(s) of the PC(s) generated by the external HSM;

second, the certificate application module constructs the certificate request message(s), and requests, through the interface IF3, the USIM application module for using the Ks_NAF generated by using the GBA or the derived next-level key(s) to encrypt the certificate request(s);

third, after the certificate request(s) is/are encrypted, the certificate application module sends, through the interface IF2, the protected certificate request(s) to the PCA server through the AP to apply for the digital PC(s);

fourth, the digital certificate(s) issued by the PCA server and the certificate(s) of the PCA server are sent to the certificate application module through the interface IF2, and the certificate application module invokes the interface IF3 to request the USIM application module to use the Ks_NAF or the derived next-level key(s) for decrypting and verifying the message(s); and fifth, if the verification succeeds, the certificate application module sends the decrypted PC(s) and the certificate(s) of the PCA server to the HSM for secure storage.

It is to be noted that the embodiments of the present disclosure have the following advantages.

First, the present disclosure eliminates the security risks such as a physical attack in the process of initial security configuration of the V2X terminal device based on the GBA, thereby ensuring the security of the whole process of initial security configuration.

Second, the present disclosure maximizes the capability of the USIM as the security module on the V2X terminal device, and results in that the terminal does not have to use the HSM, thereby reducing the cost of terminal implementation while improving the security of the whole system.

Third, the present disclosure can be compatible with the related technical solutions tin the automobile industry in which the HSM is generally used to generate and manage the keys, so it has good compatibility.

Fourth, the present disclosure lays a foundation for ensuring the security of PC5 interface direct communication of the V2X terminal device.

Figure 11:
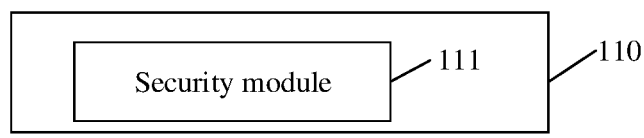
FIG. 11 is a schematic diagram of modules of a terminal device according to embodiments of the present disclosure.

As shown in FIG. 11, the terminal device according to the embodiments of the present disclosure may include a security module 111.

The security module 111 is configured to: establish a secure channel with a CA server through one or more session keys shared by the security module and the CA server; and obtain one or more digital certificates from the CA server. The security module is to implement USIM functions.

Optionally, when the CA server is an ECA server, the one or more digital certificates are one or more ECs, and in order to obtain the one or more digital certificates from the CA server, the security module 11 is configured to:
generate one or more public and private key pairs for applying for the one or more ECs; and
obtain the one or more ECs from the ECA server with the one or more public and private key pairs.

Optionally, when the CA server is an ECA server, the one or more digital certificates are one or more ECs. After obtaining the one or more digital certificates from the CA server, the security module 111 is further configured to:
store the one or more ECs by the security module.

Further, when the CA server is a PCA server, the one or more digital certificates are one or more PCs, and in order to obtain the one or more digital certificates from the CA server, the security module 11 is configured to:
sign one or more PC application messages by using the one or more private keys of the one or more ECs; and
obtain the one or more PCs from the PCA server according to the one or more PC application messages.

Specifically, in order to obtain the one or more PCs from the PCA server, the security module 111 is configured to:
receive one or more feedback messages sent by the PCA server, verify one or more signatures of the received one or more feedback messages with the one or more public keys of the PCA server, and obtain the one or more PCs.

Further, after obtaining the one or more PCs from the PCA server, the security module 111 is further configured to:
sign message(s) transmitted directly on PC5 interface with one or more private keys of the one or more PCs; and
send the signed message(s) transmitted directly on PC5 interface to the other device.

Optionally, when the CA server is an ECA server, the one or more digital certificates are one or more ECs. After obtaining the one or more digital certificates from the CA server, the security module 111 is further configured to:
send the one or more ECs to the HSM.
The HSM is configured to store the one or more ECs.
The HSM is further configured to:
generate the one or more public and private key pairs for applying for the one or more ECs; and
send the one or more public keys for applying for the one or more ECs to the security module.

The security module 111 is further configured to obtain the one or more ECs from the ECA server with the one or more public keys.

Further, when the CA server is a PCA server, the one or more digital certificates are one or more PCs. In order to obtain the one or more digital certificates from the CA server, the security module 11 is configured to:
send the one or more PCs to the HSM.
The HSM is configured to store the one or more PCs.
Specifically, the HSM is further configured to generate the one or more public and private key pairs for applying for the one or more PCs.
The HSM is configured to send the one or more public keys for applying for the one or more PCs to the security module.

The security module 111 is further configured to obtain the one or more PCs from the PCA server with the one or more public keys.

Further, after obtaining the one or more digital certificates from the CA server, the security module 111 is further configured to:
sign message(s) transmitted directly on PC5 interface with one or more private keys of the one or more PCs; and
send the signed message(s) transmitted directly on PC5 interface to the other devices.

Specifically, a Generic Bootstrapping Architecture (GBA) secure channel is established between the security module and the CA server by means of a GBA based on a Universal Integrated Circuit Card (UICC).

It is to be noted that the terminal device according to the embodiments of the present disclosure can perform the provisioning method, so all implementation modes in the embodiments of the provisioning method are applied to the terminal device and can achieve the same or similar beneficial effects.

The embodiments of the present disclosure also provide a terminal device, which includes a transceiver and a processor.

The processor is configured to:
control a security module to establish a secure channel with a CA server through one or more session keys shared by the security module and the CA server; and
obtain one or more digital certificates from the CA server.
The security module is configured to implement USIM functions.

Optionally, when the CA server is an ECA server, the one or more digital certificates are one or more ECs. In obtaining the one or more digital certificates from the CA server, the processor is configured to:
control the security module to generate one or more public and private key pairs for applying for the one or more ECs; and
obtain the one or more ECs from the ECA server with the one or more public and private key pairs.

Optionally, when the CA server is an ECA server, the one or more digital certificates are one or more ECs. After obtaining the one or more digital certificates from the CA server, the processor is further configured to:
store the one or more ECs by the security module.

Further, when the CA server is an PCA server, the one or more digital certificates are one or more PCs. In obtaining the one or more digital certificates from the CA server, the processor is configured to:
control the security module to sign the one or more PC application messages with the one or more private keys of the one or more ECs; and
obtain the one or more PCs from the PCA server according to the one or more PC application messages.

Specifically, in obtaining the one or more PCs from the PCA server, the processor is configured to:
receive one or more feedback messages sent by the PCA server, verify a signature of the received one or more feedback messages with the one or more public keys of the PCA server, and obtain the one or more PCs.

Further, after obtaining the one or more PCs from the PCA server, the processor is further configured to:
control the security module to sign message(s) transmitted directly on PC5 interface with one or more private keys of the one or more PCs; and
send the signed message(s) transmitted directly on PC5 interface to other devices.

Optionally, when the CA server is an ECA server, the one or more digital certificates are one or more ECs, and after obtaining the one or more digital certificates from the CA server, the processor is further configured to:
control the transceiver to send the one or more ECs to the HSM;
control the HSM to store the one or more ECs.

Further, in obtaining the one or more digital certificates from the CA server, the processor is further configured to:
control the HSM to generate the one or more public and private key pairs for applying for the one or more ECs;
control the HSM to send the one or more public keys for applying for the one or more ECs to the security module; and
control the security module to obtain the one or more ECs from the ECA server with the one or more public keys.

Further, when the CA server is a PCA server, the one or more digital certificates are one or more PCs, and in obtaining the one or more digital certificates from the CA sever, the processor is configured to:
control the transceiver to send the one or more PCs to the HSM;
control the HSM to store the one or more PCs.

Further, in obtaining the one or more digital certificates from the CA sever, the processor is configured to:
control the HSM to generate the one or more public and private key pairs for applying for the one or more PCs;
control the HSM to send the one or more public keys for applying for the one or more PCs to the security module; and
control the security module to obtain the one or more PCs from the PCA server with the one or more public keys.

Further, after obtaining the one or more digital certificates from the CA server, the processor is further configured to:
control the security module to sign the message(s) transmitted directly on PC5 interface with one or more private keys of the one or more PCs; and
send the signed message(s) transmitted directly on PC5 interface to the other devices.

Specifically, a secure channel is established between the security module and the CA server by means of a Generic Bootstrapping Architecture based on a Universal Integrated Circuit Card (UICC) (GBA_U).

The embodiments of the present disclosure also provide a terminal device, which may include: a memory, a processor and a computer program stored in the memory and capable of running on the processor. When executing the program, the processor implements each process in the above embodiments of provisioning transmission method and can achieve the same technical effects. For avoiding repetitions, elaborations are omitted herein.

The embodiments of the present disclosure also provide a computer readable storage medium, in which a computer program is stored. When executed by the processor, the program implements each process in the above embodiments of the provisioning method and can achieve the same technical effects. For avoiding repetitions, elaborations are omitted herein. The computer-readable storage medium is a Read-Only Memory (ROM), a Random Access Memory (RAM), a magnetic disk or an optical disc, etc.

Those skilled in the art should understand that the embodiments of the present application may be provided as a method, a system or a computer program product. Thus, the present application may adopt forms of complete hardware embodiments, complete software embodiments or embodiments integrating software and hardware. Moreover, the present application may adopt the form of a computer program product implemented on one or more computer readable storage media (including, but not limited to, a disk memory and an optical memory) containing computer available program codes.

The present application is described with reference to flowcharts and/or block diagrams of the method, the device (system) and the computer program product according to the embodiments of the present application. It is to be understood that each flow and/or block in the flowcharts and/or the block diagrams and combinations of the flows and/or blocks in the flowcharts and/or the block diagrams may be implemented by computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable storage medium which can guide the computer or other programmable data processing devices to work in a particular way, so that the instructions stored in the computer-readable storage medium generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

Modules, units, subunits or sub-modules may be one or more integrated circuits configured to implement the above method, for example, one or more Application Specific Integrated Circuits (ASICs), or one or more Digital Signal Processors (DSPs), or one or more Field Programmable Gate Arrays (FPGAs), etc. For another example, when one of the above modules is realized by a processing component calling program codes, the processing component can be a general-purpose processor, such as a Central Processing Unit (CPU), or other processors that can call the program codes. For another example, these modules can be integrated together in the form of System-On-a-Chip (SOC).

Terms "first", "second" and the like in the specification and claims of the present disclosure are used to distinguish similar objects and do not have to describe a specific sequence or order. It should be understood that the objects may be exchanged under appropriate circumstances, so that the embodiments of the present application described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. In addition, "and/or" is used in the specification and claims to indicate at least one of the connected objects. For example, A and/or B and/or C indicates seven cases, that is, individual A is included, individual B is included, individual C is included, both A and B exist, both B and C exist, both A and C exist, and A, B, and C all exist. Similarly, the use of "at least one of A and B" in the specification and claims should be understood as "separate A, separate B, or both A and B".

The above is the optional implementation mode of the disclosure. It is to be pointed out that those of ordinary skill in the art may further make a plurality of improvements and embellishments without departing from the principle of the disclosure, and these improvements and embellishments shall fall within the scope of protection of the disclosure.

The invention claimed is:

1. A provisioning method, applied to a terminal device, the method comprising:
    establishing, by a security module, a secure channel with a Pseudonym Certificate Authority (PCA) server through one or more session keys shared by the security module and the PCA server;
    signing, by the security module, one or more Pseudonym Certificate (PC) application messages with one or more private keys of one or more Enrollment Certificates (ECs); and
    obtaining, by the security module, one or more PCs from the PCA server according to the one or more PC application messages;
    wherein after obtaining the one or more PCs from the PCA sever, the method further comprises:
        signing, by the security module, one or more messages transmitted directly on PC5 interface with one or more private keys of the one or more PCs; and
        sending the signed one or more messages to other devices; and
    wherein the security module is to implement Universal Subscriber Identity Module (USIM) functions.

2. The provisioning method of claim 1, wherein obtaining the one or more PCs from the PCA server comprises:
    receiving one or more feedback messages sent by the PCA server;
    verifying one or more signatures of the received one or more feedback messages with one or more public keys of the PCA server; and
    obtaining the one or more PCs.

3. The provisioning method of claim 1, wherein obtaining the one or more PCs from the PCA sever comprises:
    sending, by the security module, the one or more PCs to a Hardware Security Module (HSM); and
    storing, by the HSM, the one or more PCs.

4. The provisioning method of claim 3, wherein obtaining the one or more PCs from the PCA sever further comprises:
    generating, by the HSM, one or more public and private key pairs for applying for the one or more PCs;
    sending, by the HSM, the one or more public keys for applying for the one or more PCs to the security module; and
    obtaining, by the security module, the one or more PCs from the PCA server with the one or more public keys.

5. A terminal device, comprising a transceiver and a processor; the processor is configured to control a security module to:
    establish a secure channel with a Pseudonym Certificate Authority (PCA) server through one or more session keys shared by the security module and the PCA server;
    sign one or more Pseudonym Certificate (PC) application messages with one or more private keys of one or more Enrollment Certificates (ECs); and
    obtain one or more PCs from the PCA server according to the one or more PC application messages;
    wherein after obtaining the one or more PCs from the PCA sever, the processor is further configured to control the security module to:
        sign one or more messages transmitted directly on PC5 interface with one or more private keys of the one or more PCs; and
        send the signed one or more messages to other devices; and
    wherein the security module is to implement Universal Subscriber Identity Module (USIM) functions.

6. The terminal device of claim 5, wherein in order to obtain the one or more PCs from the PCA server, the processor is configured to control the security module to:
    receive one or more feedback messages sent by the PCA server;
    verify a signature of the received one or more feedback messages with one or more public keys of the PCA server; and
    obtain the one or more PCs.

7. The terminal device of claim 5, wherein in order to obtain the one or more PCs from the PCA sever, the processor is further configured to:
    control the security module to send the one or more PCs to a Hardware Security Module (HSM); and
    control the HSM to store the one or more PCs.

8. The terminal device of claim 7, wherein in order to obtain the one or more PCs from the PCA sever, the processor is further configured to:
    control the HSM to generate one or more public and private key pairs for applying for the one or more PCs;
    control the HSM to send the one or more public keys for applying for the one or more PCs to the security module; and
    control the security module to obtain the one or more PCs from the PCA server with the one or more public keys.

9. The terminal device of claim 7, wherein in order to obtain the one or more PCs from the PCA sever, the processor is further configured to control the security module to:

sign one or more messages transmitted directly on PC5 interface with the one or more private keys of the one or more PCs; and send the signed one or more messages to other devices.

* * * * *